(12) United States Patent
Kiehl

(10) Patent No.: US 7,321,628 B2
(45) Date of Patent: Jan. 22, 2008

(54) DATA TRANSMISSION SYSTEM WITH REDUCED POWER CONSUMPTION

(75) Inventor: Oliver Kiehl, Charlotte, VT (US)

(73) Assignee: Infineon Technologies AG, Munich (DE)

( * ) Notice: Subject to any disclaimer, the term of this patent is extended or adjusted under 35 U.S.C. 154(b) by 738 days.

(21) Appl. No.: 10/674,859

(22) Filed: Sep. 30, 2003

(65) Prior Publication Data

US 2005/0069043 A1   Mar. 31, 2005

(51) Int. Cl.
    H04L 27/00 (2006.01)
(52) U.S. Cl. .................................. 375/259
(58) Field of Classification Search ............ 375/259, 375/286, 292; 341/50, 51, 58, 65, 67
    See application file for complete search history.

(56) References Cited

U.S. PATENT DOCUMENTS

| | | | |
|---|---|---|---|
| 4,667,337 A | 5/1987 | Fletcher | |
| 5,025,256 A | 6/1991 | Stevens | |
| 5,481,555 A | 1/1996 | Wade et al. | |
| 5,572,736 A | 11/1996 | Curran | |
| 5,574,921 A | 11/1996 | Curran | |
| 5,890,005 A | 3/1999 | Lindholm | |
| 6,026,124 A | 2/2000 | Lee et al. | |
| 6,243,779 B1 | 6/2001 | Devanney et al. | |
| 6,553,445 B1 | 4/2003 | Drapkin et al. | |
| 6,614,287 B1* | 9/2003 | Gauthier et al. | 327/362 |
| 2004/0109509 A1* | 6/2004 | Stonecypher et al. | 375/286 |
| 2005/0219074 A1* | 10/2005 | Kahlman | 341/51 |

FOREIGN PATENT DOCUMENTS

GB   1090112   11/1967

OTHER PUBLICATIONS

Macri, J., "Graphics DDR Present and Future," JEDEX San Jose, a JEDEC Conference, Mar. 25, 2003.
Mircea, R.S., "Bus-Invert Coding for Low-Power I/O," IEEE Transactions on Very Large Scale Integration (VLSI) Systems, Mar. 1995, pp. 49-58, vol. 3, No. 1, IEEE, Inc., New York, US.

* cited by examiner

*Primary Examiner*—Khai Tran
(74) *Attorney, Agent, or Firm*—Slater & Matsil, L.L.P.

(57) ABSTRACT

System and method for reducing power consumption and noise in a transmission system with an asymmetrically terminated transmission line. A preferred embodiment comprises encoding data words to reduce the number of times a given state appears in a code word. The preferred embodiment comprises counting the number of times a given state appears in a data word. If the count is greater than half of the total number of bits in the data word, then the data word is inverted and a weight bit can be set to the given state. If the count is less than (or equal to) half of the total number of bits, then the data word may be unchanged and the weight bit can be set to the inverse of the given state. The code word can be generated by appending the weight bit to the data word.

17 Claims, 8 Drawing Sheets

DATA TRANSMISSION SYSTEM WITH REDUCED POWER CONSUMPTION

TECHNICAL FIELD

The present invention relates generally to a system and method for digital communications, and more particularly to a system and method for reducing power consumption and noise in a transmission system with an asymmetrically terminated transmission line.

BACKGROUND

It is common to encode data prior to transmitting the data. The encoding of data can be for different reasons. For example, certain codes can embed a clock signal into the data, others can enable a certain level of tolerance to errors and interference, while some codes can reduce the amount of power required to transmit the data. Therefore, a significant amount of research and development has gone into coding schemes (along with attendant encoders and decoders). A properly designed and selected coding scheme can result in a system with a better performance level than a system that is not using a coding scheme, while a poorly designed coding scheme can actually degrade performance.

A coding scheme can reduce the amount of power required to transmit data. This may be achieved by reducing the total number of transitions in the transmission or by reducing the number of times a certain state appears in the transmission of the data. Transitions may cause increased power consumption since the transition may incur a current flow while a steady state value may not. Certain states in a transmission may increase power consumption if that state requires more current to sustain than other states.

However, coding schemes to reduce power consumption are typically designed for systems where the transmission lines are symmetrically terminated. A symmetrically terminated transmission line is one where the load seen by the various states of the transmission is the same. In some systems, the load may appear to be different for different states (commonly referred to as asymmetrically terminated transmission lines) and therefore, the coding schemes designed for symmetrically terminated transmission lines may not perform well.

SUMMARY OF THE INVENTION

These and other problems are generally solved or circumvented, and technical advantages are generally achieved, by preferred embodiments of the present invention which provides for a system to minimize power consumption when transmitting data in an asymmetrically terminated communications system.

In accordance with a preferred embodiment of the present invention, a method for minimizing the number of appearances of a given state in a code word generated from a data word comprising counting the number of times the given state appears in the data word, if the count is greater than half of a total number of bits in the data word, then inverting the data word, setting a weight bit to the given state, and else setting the weight bit to an inverse of the given state.

In accordance with another preferred embodiment of the present invention, a circuit comprising an encoder coupled to a data input, the encoder containing circuitry to convert data words from the data input into code words with a minimized number of occurrences of a given state, and a transmitter coupled to the encoder, the transmitter containing circuitry to inject the code words onto a transmission line, wherein the transmission line is asymmetrically terminated.

In accordance with another preferred embodiment of the present invention, a transmission system comprising an encoder coupled to a data input, the encoder containing circuitry to convert data words from the data input into code words with a minimized number of occurrences of a given state, a transmitter coupled to the encoder, the transmitter containing circuitry to inject the code words onto a transmission line, wherein the transmission line is asymmetrically terminated, a receiver coupled to the transmission line, the receiver containing circuitry to receive code words from the transmission line, and a decoder coupled to the receiver, the decoder containing circuitry to convert code words into data words.

An advantage of a preferred embodiment of the present invention is that the number of state transitions and high power consumption states needed to transmit data are reduced. Therefore, the power required to transmit the data is reduced compared to when the data is transmitted without the use of a preferred embodiment of the present invention or when using a non-optimized coding scheme.

A further advantage of a preferred embodiment of the present invention is that the encoding requires low overhead. Therefore, the code word (the encoded data) is only slightly greater than the data itself. With the code word being only slightly longer than the non-encoded data, the great majority of the available data bandwidth is used to transmit the data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a transmission system wherein the transmission line is asymmetrically terminated. The invention may also be applied, however, to other transmission systems wherein there is a desire to reduce state transitions and certain transmission line states.

Figure 1:
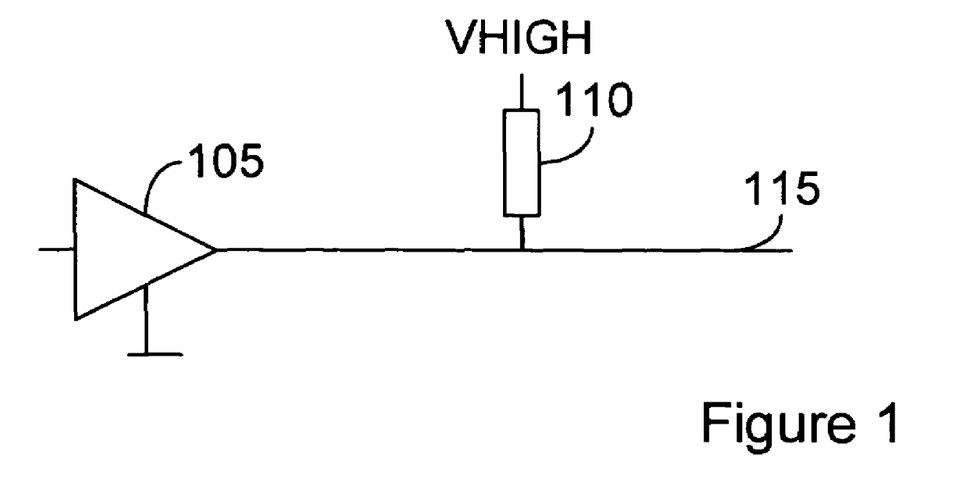
FIG. 1 is a diagram of a pull-down line driver with a high-terminated transmission line.

With reference now to FIG. 1, there is shown a diagram illustrating a pull-down driver 105 with a termination 110 to a high voltage potential. The pull-down driver 105 can be used to pull the voltage on a transmission line 115 to a low voltage potential. The voltage potential on the transmission line 115 can be representative of a certain state on the transmission line 115. For example, when the voltage potential of the transmission line 115 is high, the transmission line 115 may be carrying a binary one value. This may represent a true or active value. When the voltage potential of the transmission line 115 is low, the transmission line may be carrying a binary zero value, which can be indicative of a false or inactive value.

Since the natural state of the transmission line 115 is a high voltage potential (since the termination 110 is coupled to VHIGH), it can require energy to drive the state of the transmission line 115 to a low voltage potential. Therefore, it can be desirous to minimize the number of times that the transmission line 115 transitions from a high voltage potential to a low voltage potential. Furthermore, maintaining the transmission line 115 in a low voltage potential state can also consume more energy than maintaining the transmission line 115 in a high voltage potential state.

Figure 2:
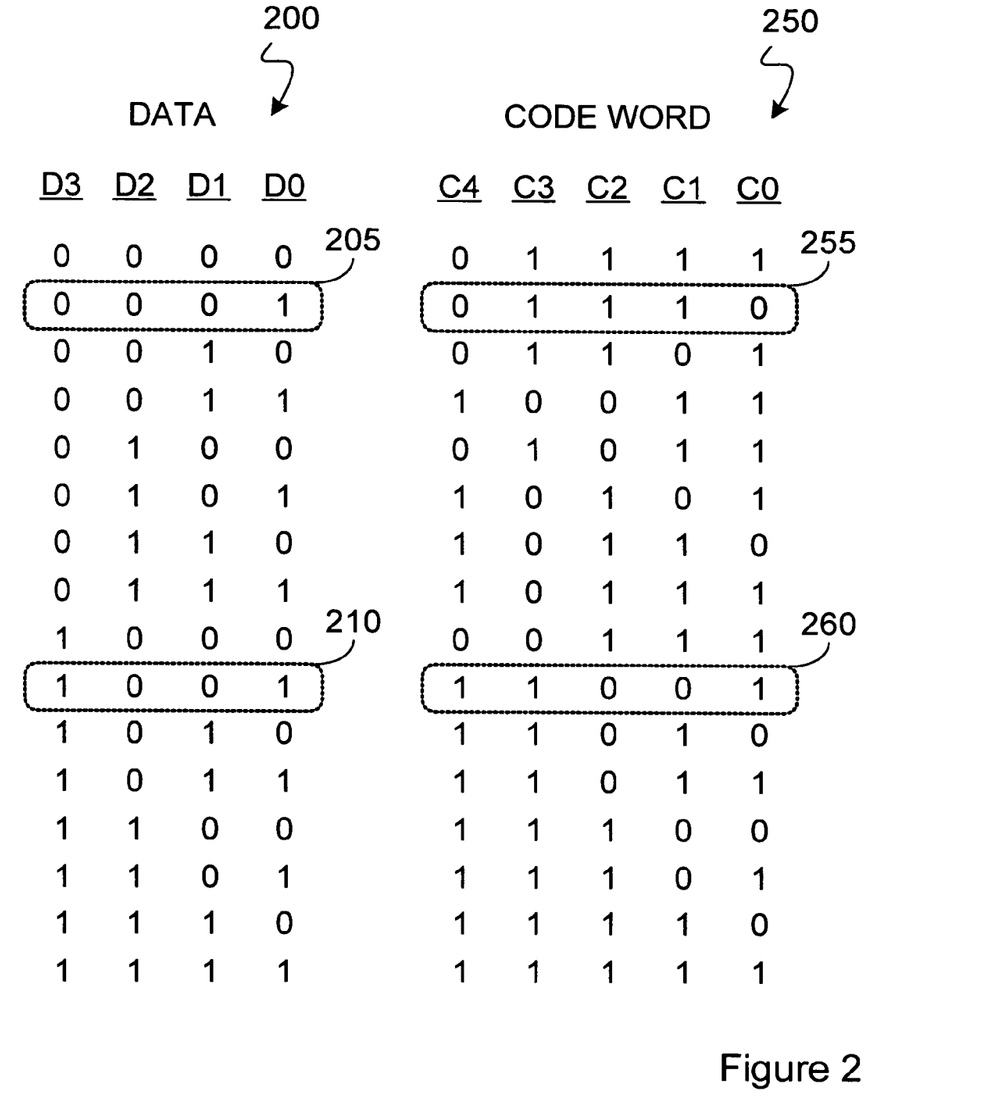
FIG. 2 is a diagram of a pair of tables illustrating a possible encoding for four-bit data words to minimize low voltage potential transitions, according to a preferred embodiment of the present invention.

With reference now to FIG. 2, there is shown a pair of tables illustrating an exemplary encoding of possible four-bit data words into five-bit code words that minimizes high voltage potential to low voltage potential transitions, according to a preferred embodiment of the present invention. A first table (a data word table 200) displays the 16 possible values for the four-bit data words and a second table (a code word table 250) displays the encoded code words for each of the 16 possible data words listed in the data word table 200.

According to a preferred embodiment of the present invention, the encoding scheme for the generation of the encoded code word is as follows: 1) count the number of zeros in a data word; 2) if the number of zeros in the data word is greater than half of the total number of bits in the data word (four data bits in the data words displayed in the data word table 200), then the entire data word should be inverted (i.e., ones converted into zeros and zeros converted into ones), then a code bit (code bit "C4" in the code word table 250) is set to zero; 3) if the number of zeros is less than half of the total number of bits in the data word, then the data word is left as is and the code bit is set to one.

As an example of the encoding scheme, take a closer look at a data word 205. The data word 205 represents the data bits with values "0 0 0 1." Clearly the number of zeros (three) is greater than half (two) of the total number of data bits (four). Therefore, according to a preferred embodiment of the present invention, the data word 205 is to be inverted and then the code bit is set to zero. This is shown in code word 255. As a second example, data word 210 represents the data bits with values "1 0 0 1." The number of zeros (two) is not greater than half (two) the number of data bits (four). Therefore, the data word 210 is not inverted and the code bit is set to one. This is shown in code word 260.

Note that FIG. 2 illustrates an example of an encoding scheme according to a preferred embodiment of the present invention for data words that are four bits in length. Other length data words can be used without changing the nature of the invention. Note also that the encoding of the data words can be accomplished with an addition of a single code bit. The single code bit can be used for any length data word. Therefore, the encoding overhead can be very low, especially with longer length data words.

Figure 3:
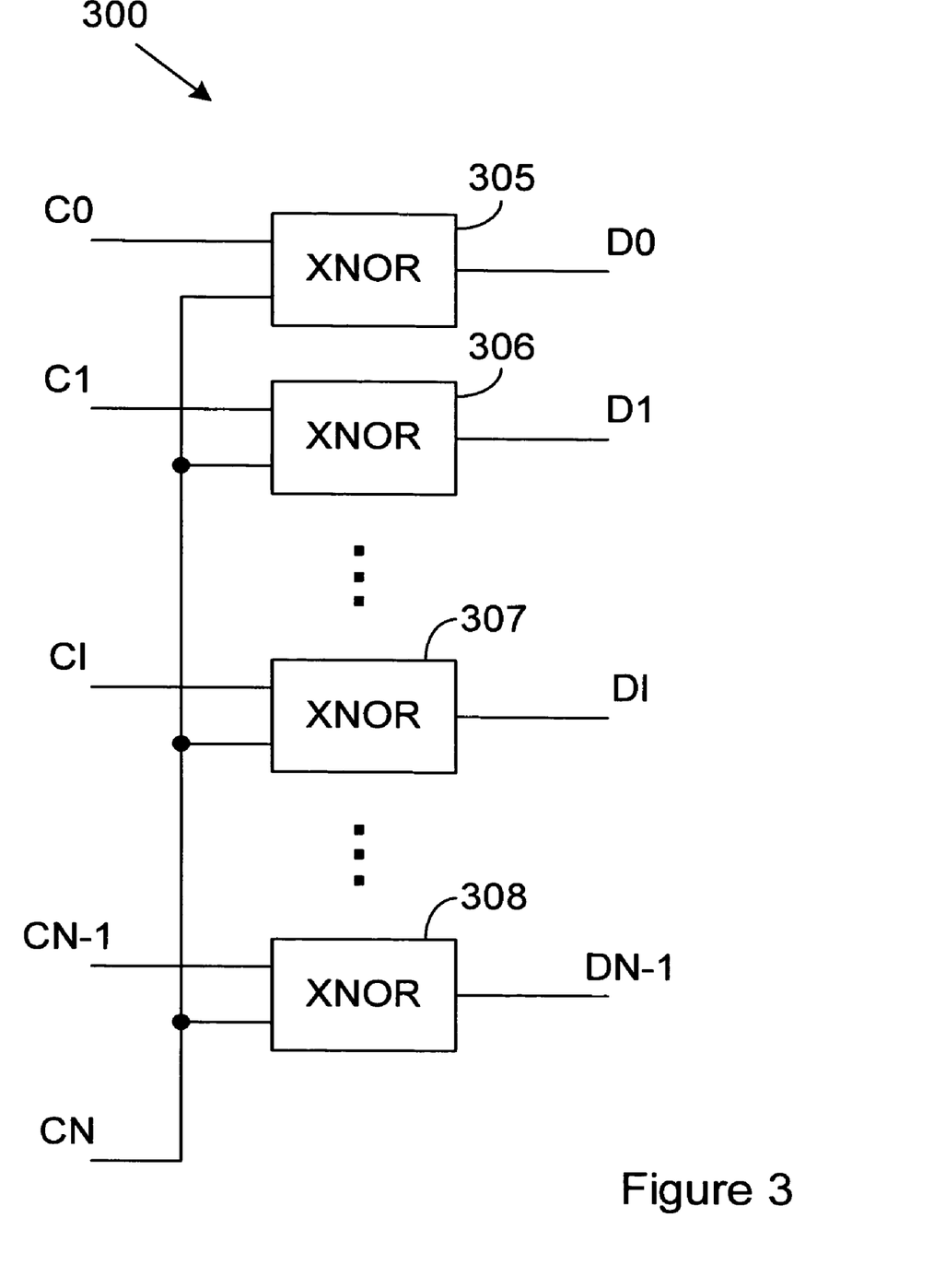
FIG. 3 is a diagram of a decoder for use in decoding code words using the encoding scheme shown in FIG. 2, according to a preferred embodiment of the present invention.

With reference now to FIG. 3, there is shown a diagram illustrating a decoder 300 for use in decoding code words encoded with an encoding scheme which minimizes state transitions and certain states, according to a preferred embodiment of the present invention. The decoder 300 has a set of inputs, one per bit of the code word. Code word bits 0 through N–1 can be thought of as being a data portion of the code word while code word bit N can be called a weight bit. Each one of the code word bits 0 through N–1 can be provided to one of a plurality of logic gates (for example, logic gates 305, 306, 307, 308, and so on). According to a preferred embodiment of the present invention, the logic gates implement an exclusive-nor (XNOR) operation. For example, code word bit "C0" may be provided to logic gate 305 while code word bit "C1" may be provided to logic gate 306. The Nth code word bit, code word bit "CN," can be provided to each one of the plurality of logic gates. The result of the logical operation returns the data word bit that corresponds to the code word bit. For example, "CN" XNOR "C0" returns data word bit "D0." Note that the XNOR operation may not be the only logical operation that can be used to perform the decoding, other logic operations can be used to decode the data word bits from the code word bits.

Figure 4:
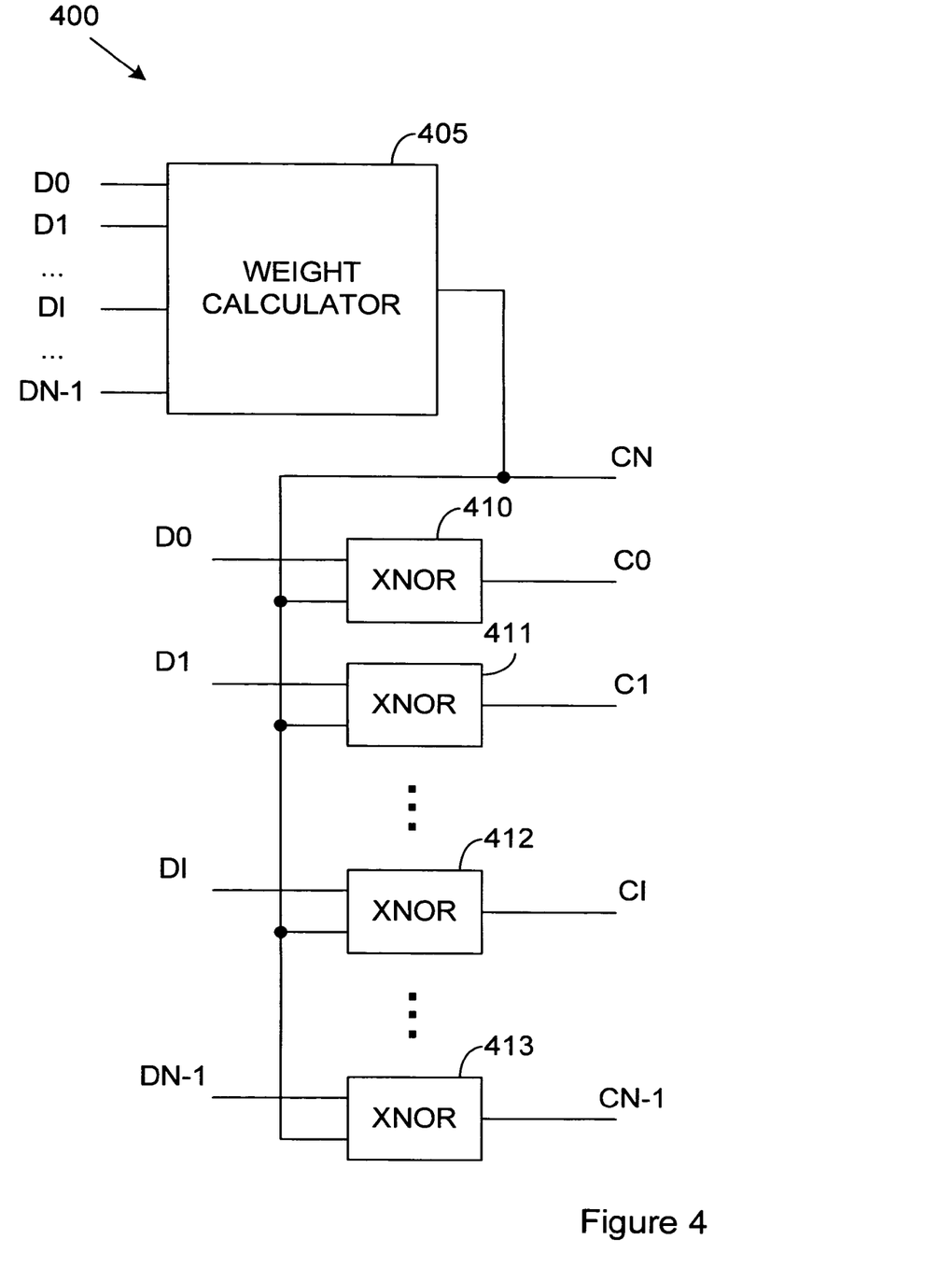
FIG. 4 is a diagram of an encoder for use in encoding code words using the encoding scheme shown in FIG. 2, according to a preferred embodiment of the present invention.

With reference now to FIG. 4, there is shown a diagram illustrating an encoder 400 to encode data words with an encoding scheme which minimizes state transitions and certain states, according to a preferred embodiment of the present invention. The encoder 400 can be provided with a set of inputs, one per bit of the data word. Data word bits 0 through N–1 can be provided to a weight calculator 405, which may be used to determine a weight bit (code word bit "CN" as discussed above) for the code word. According to a preferred embodiment, the weight bit can be a one (1) value if the number of zeros in the data word is less than half of the total number of bits in the data word and it can be a zero (0) value if the number of zeros in the data word is greater than (or equal to) half of the total number of bits in the data word. A discussion of the weight calculator 405 may be found below.

In addition to being provided to the weight calculator 405, each bit of the data word can also be provided to one of a plurality of logic gates (such as logic gates 410, 411, 412, 413, and so forth). According to a preferred embodiment of the present invention, the logic gates implement an exclusive-nor (XNOR) operation. In addition to the data word bits, each of the logic gates receives an output from the weight calculator 405. For example, logic gate 410 receives as input data word bit "D0" and the output of the weight calculator 405. The XNOR operation of the data word bit and the output of the weight calculator 405 (the weight bit) can result in a corresponding code word bit. For example, data word bit "D0" XNOR "CN" can produce code word bit "C0." Note that the XNOR operation may not be the only logical operation that can be used to perform the encoding, other logic operations can be used to encode the data word bits into the code word bits.

Figure 5:
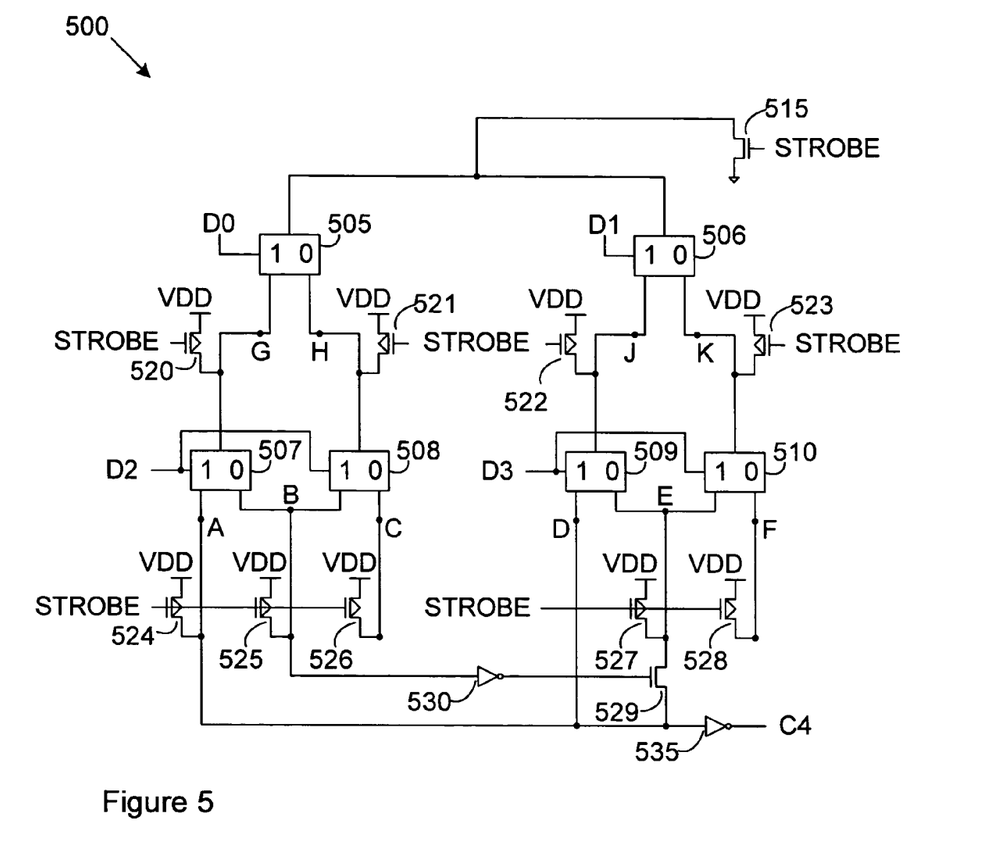
FIG. 5 is a diagram of a weight calculator for use in an encoder, according to a preferred embodiment of the present invention.

With reference now to FIG. 5, there is shown a diagram illustrating a weight calculator 500, according to a preferred embodiment of the present invention. As illustrated in FIG. 5, the weight calculator 500 can determine the number of zeros in a four-bit data word and then set a weight bit depending on the number of zeros. As discussed above, if the number of zeros is less than half of the total number of bits in the data word, then the weight bit can be set to one (1). Otherwise, the weight bit can be set to zero (0). However, the design of the weight calculator 500 may be extended to determine the weight of data words with lengths greater than four bits. Extending the design of the weight calculator 500 to be operable with a larger number of data word bits is considered well understood by those of ordinary skill in the art of the present invention.

Data bits (labeled D0, D1, D2 and D3) from the data word being weighed can be provided to a series of switches (for example, switches 505, 506, 507, 508, 509, 510 and so on). According to a preferred embodiment of the present invention, each of the data bits can be used to control the operation of the switch. For example, data bit "D0" can be provided to switch 505 and depending on the value of data bit "D0," an input to the switch 505 can be routed to one of two outputs. A one-input to two-output multiplexer may be an implementation of a switch. If data bit "D0" is a zero (0), then the input can be routed to an output associated with a zero input, for example.

According to a preferred embodiment of the present invention, the switches (switches 505 through 510) can be arranged in a hierarchical fashion, with a pair of switches (505 and 506) being in a first hierarchy and remaining switches (507 through 510) being in a second hierarchy. A switch in the first hierarchy (for example, switch 506) may have its outputs coupled to the inputs of two switches in the second hierarchy (for example, switches 509 and 510), with an output associated with a zero (0) input going to one switch (switch 509) and an output associated with a one (1) going to another switch (switch 510).

Each switch in the first hierarchy has a single data word bit controlling its function. For example, the switch 505 may be controlled by data bit "D0" while data bit "D1" can control the switch 506. Meanwhile, switches in the second hierarchy, such as the switches 509 and 510, may be grouped into pairs and can be controlled by a single data bit (data bit "D3" in the case of the switches 509 and 510, for example). As shown in FIG. 5, the data bit and the switches that they control are as follows: "D0"—switch 505, "D1"—switch 506, "D2"—switches 507 and 508, and "D3"—switches 509 and 510. Note that this is only an exemplary arrangement of data bits and switches and that other arrangements can be possible.

Input to the switches in the first hierarchy of switches (switches 505 and 506) can be grounded with the connection being possibly controlled by a switch 515. The switch 515 may be a simple on/off switch implemented as a transistor. According to a preferred embodiment of the present invention, the switch 515 can be controlled by a signal referred to as "STROBE," carried on a signal line. The signal "STROBE" may be in an active state when all data bits of the data word have stabilized. When the data bits are not stabilized, then the signal "STROBE" may be in an inactive state. When the signal "STROBE" is active, the switch 515 can close and couple the ground to the input of the first hierarchy of switches. When the signal "STROBE" is inactive, the switch 515 is open and the inputs of the first hierarchy of switches are not coupled to the substrate ground.

Outputs of the switches (switches 505 through 510) can also be coupled to a high voltage potential by switches (such as switch 520) that can also be controlled by the "STROBE" signal carried on signal lines. Other switches (switches 521 through 528) can be similarly coupled to other outputs. According to a preferred embodiment of the present invention, switches 520 through 528 are implemented as P-type MOSFETs (metal-oxide semiconductor field-effect transistors) and obtain their power from a positive power supply. As discussed above, when the signal "STROBE" is active, the switches can close and couple the output of the switches to the high voltage potential. According to a preferred embodiment of the present invention, the weight bit (labeled "C4" in FIG. 5), may be a combination of the various outputs of the second hierarchy of switches (switches 507 through 510) in conjunction with some inverters (inverters 530 and 535).

For exemplary purposes, let the data word being evaluated be "0 0 0 1" with data bit "D3" being one (1). The weight bit for this particular code word should be "0," since the number of zeros (3) is greater than half (2) of the number of data bits (4). With data bits "D0," "D1," and "D2" being zero (0) and "D3" being one (1), switches 505 through 510 all route their respective inputs to their corresponding outputs depending on the value of their control signals. Therefore, there is a current path from node C to node H to substrate ground (path C-H-SG) and node E to node K to substrate ground (path E-K-SG). Path C-H-SG may have no impact upon the determination of the weight bit "C4." Path E-K-SG may result in a voltage potential at a switch 529. However, since input to the inverter 530 may be high (due to switch 525), the input to the switch 529 may be low, keeping the switch 529 open. With switch 529 open, the value of the weight bit "C4" may be determined by the value of the inverter 535 which may have a high input (due to switch 524). Since the input to the inverter 535 may be high, then its output may be low. Therefore, the weight bit "C4" may be low.

Figure 6:
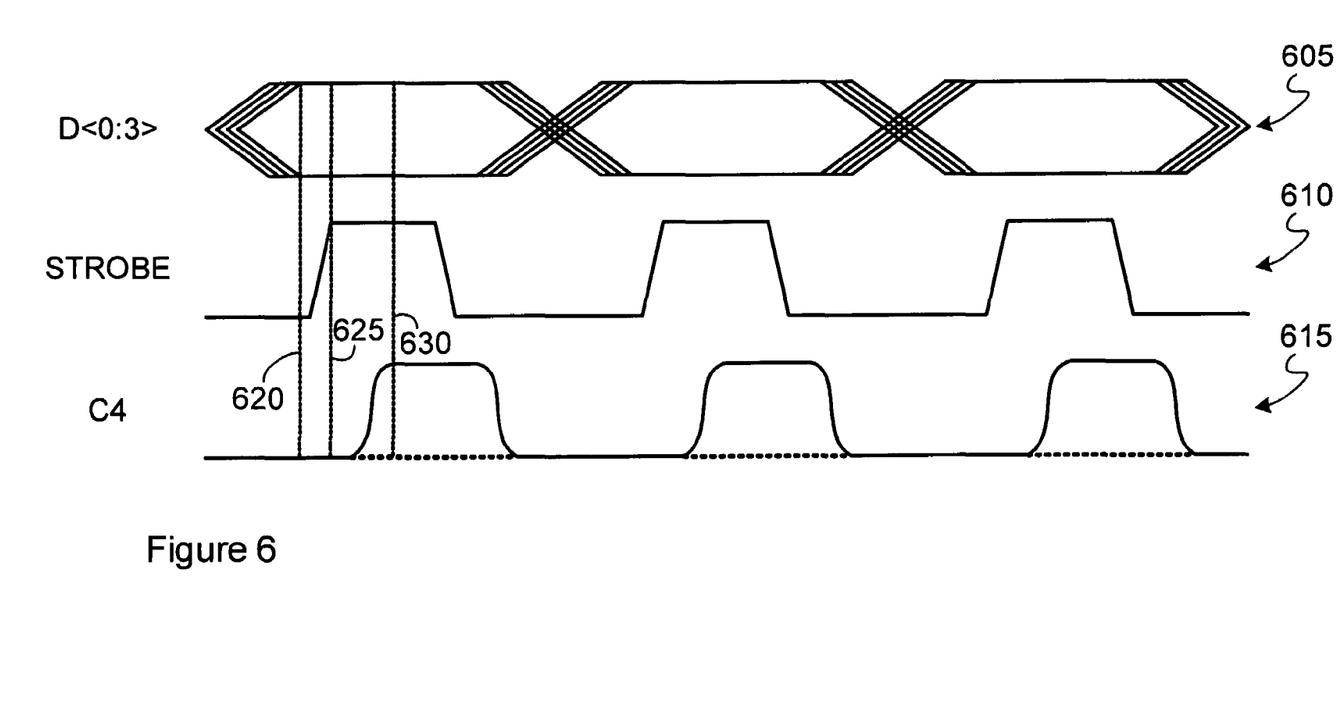
FIG. 6 is a diagram illustrating the operation of the weight calculator shown in FIG. 5.

With reference now to FIG. 6, there is shown a timing diagram illustrating the operation of the weight calculator 500 (FIG. 5), according to a preferred embodiment of the present invention. FIG. 6 displays a timing relationship between the data bits of a data word, the derivation of the signal "STROBE," and the determination of a weight bit for the data word by the weight calculator 500. A first curve 605 illustrates signal values of all data bits of a data word (four in this example). At a time denoted by a dashed vertical line 620, all of the data bits of the data word may become stable. A second curve 610 illustrates the signal "STROBE." Some amount of time after the stabilization of all of the data bits of the data word (shown as a second dashed vertical line 625), the signal "STROBE" can become active. After the signal "STROBE" becomes active, the weight calculator 500 can begin determining the value of the weight bit. A third curve 615 represents the value of the weight bit. At a third dashed vertical line 630, the weight bit may take on a value that can be dependent upon the value of the data bits of the data word, either high (1) if the number of zeros is less than (or equal to) half of the total number of data bits or low (0) if the number of zeros is greater than half of the total number of data bits.

The above discussion focuses mainly upon a transmission system with an asymmetrically terminated transmission line wherein the transmission line was asymmetrically terminated with a high voltage potential. Therefore, it was possible to minimize power consumption by minimizing the number of times that the transmission line had to transition to a low voltage potential, i.e., minimize the number of zeros. However, other transmission systems may be asymmetrically terminated with their transmission lines terminated with a low voltage potential. In these cases, to minimize power consumption, the minimization of the number of transitions to a high voltage potential is required. This can be achieved by minimizing the number of ones.

Figure 7:
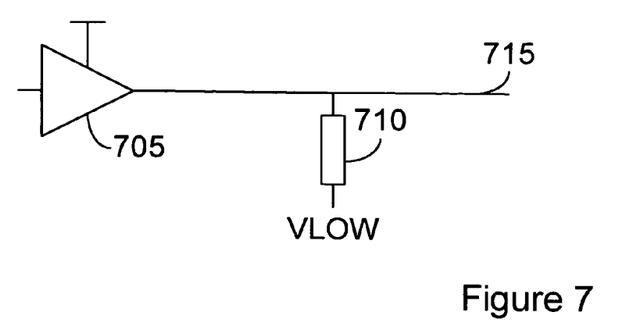
FIG. 7 is a diagram of a pull-up line driver with a low-terminated transmission line.

With reference now to FIG. 7, there is shown a figure illustrating a pull-up driver 705 with a termination 710 to a low voltage potential. The pull-up driver 705 can be used to pull the voltage on a transmission line 715 to a high voltage potential. Because the natural state of the transmission line 715 is a low voltage potential, it can require energy to pull the state of the transmission line 715 to a high voltage potential. Therefore, it can be desired to minimize the number of times that the transmission line 715 transitions from a low voltage state to a high voltage state.

Figure 8:
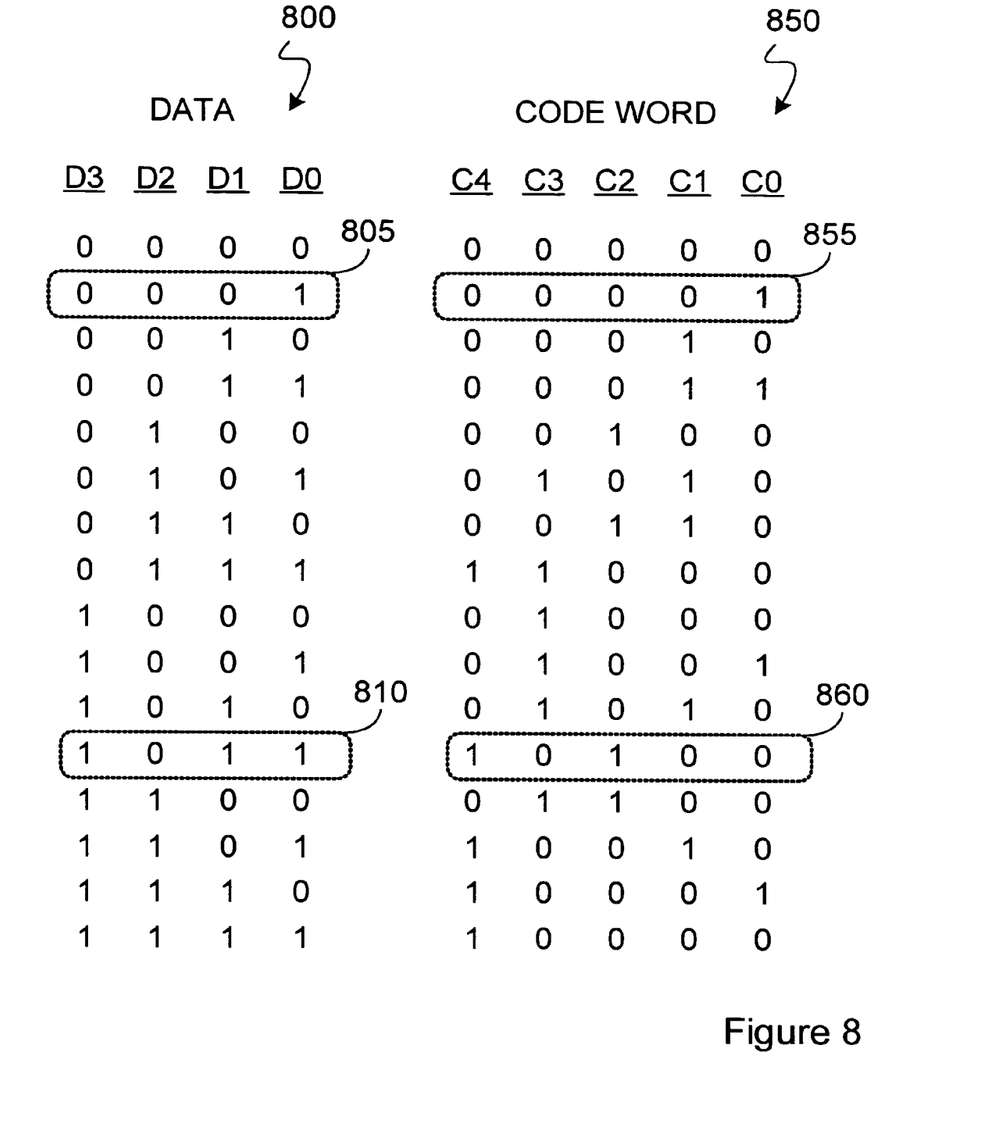
FIG. 8 is a diagram of a pair of tables illustrating a possible encoding for four-bit data words to minimize high voltage potential transitions, according to a preferred embodiment of the present invention.

With reference now to FIG. 8, there is shown a pair of tables illustrating an exemplary encoding of possible four-bit data words into five-bit code words that minimizes low voltage potential to high voltage potential transitions, according to a preferred embodiment of the present invention. A first table (a data word table 800) displays the 16 possible values for the four-bit data words and a second table (a code word table 850) displays the encoded code words for each of the 16 possible data words listed in the data word table 800.

According to a preferred embodiment of the present invention, the encoding scheme for the generation of the encoded code word is as follows: 1) count the number of ones in a data word; 2) if the number of ones in the data word is greater than half of the total number of bits in the data word (four data bits in the data words displayed in the data word table 800), then the entire data word should be inverted (i.e., ones converted into zeros and zeros converted into ones), then a code bit (code bit "C4" in the code word table 850) is set to one; 3) if the number of ones is less than half of the total number of bits in the data word, then the data word is left as is, and the code bit is set to zero. Two examples 805/855 and 810/860 are indicated in the Figure.

Figure 9:
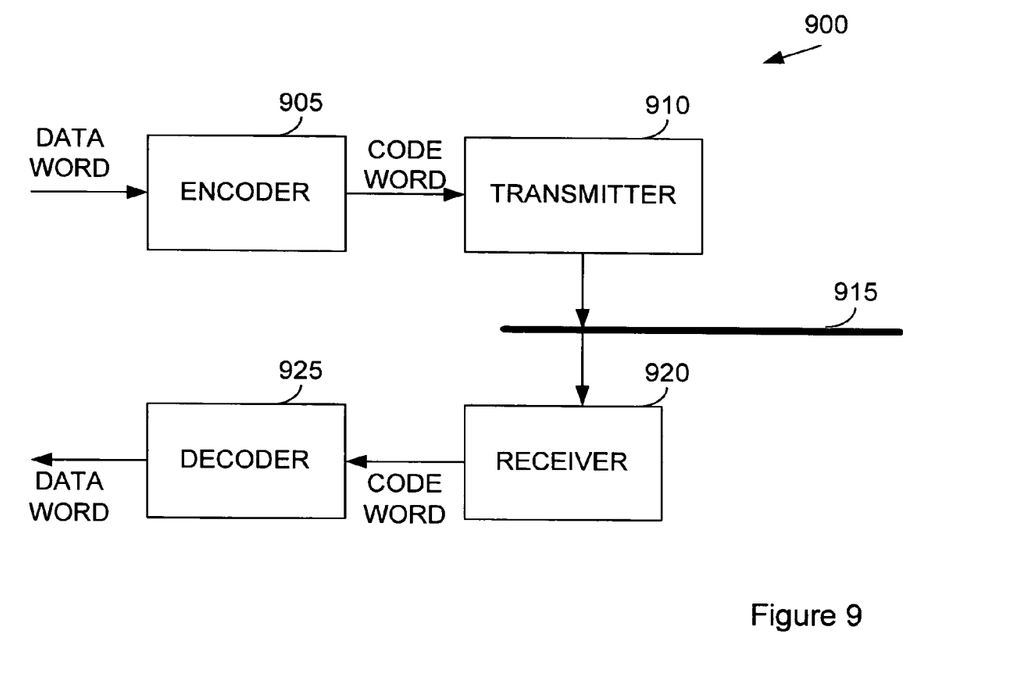
FIG. 9 is a diagram of a transmission system with an asymmetrically terminated transmission line.

With reference now to FIG. 9, there is shown a transmission system 900 wherein the transmission system 900 may use a transmission line 915 that is asymmetrically terminated, according to a preferred embodiment of the present invention. The transmission system 900 has the capability to send and receive data words that have been encoded to help minimize power consumption. To transmit data words, the transmission system 900 can take data words that are to be transmitted and provide them to an encoder 905 wherein the data words can be encoded using a specified encoding scheme to minimize power consumption (based in part upon the asymmetrically terminated transmission line 915). The code words produced by the encoder 905 can then be injected onto the transmission line 915 by a transmitter 910.

To receive data words that can be sent to the transmission system 900 via the transmission line 915, the transmission system 900 can use a receiver 920 to detect the code words that are intended for the transmission system 900. The receiver 920 can extract the code words from the transmission line and can provide the code words to a decoder 925. The decoder 925 can make use of a decoding scheme and convert the code words back into data words that can be used by devices (not shown) coupled to the transmission system 900.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
   an encoder coupled to a data input, the encoder containing circuitry to convert data words from the data input into code words with a minimized number of occurrences of a given state; and
   a transmitter coupled to the encoder, the transmitter containing circuitry to inject the code words onto a transmission line, wherein the transmission line is asymmetrically terminated.

2. The circuit of claim 1, wherein the code word is one bit longer than the data word.

3. The circuit of claim 1, wherein the encoder comprises:
   a weight calculator coupled to the data input, the weight calculator containing circuitry to determine a count of the number of times the given state appears in a data word and to compute a weight bit based on the count; and
   a plurality of logic blocks coupled to the data input and the weight calculator, wherein each logic block is coupled to a single bit of the data input and the weight bit computed by the weight calculator, the logic block to combine the inputs to produce a bit of the code word.

4. The circuit of claim 3, wherein the logic block is implemented as an exclusive-nor (XNOR) logic gate.

5. The circuit of claim 3, wherein there is one logic block for each bit in the data word.

6. The circuit of claim 3, wherein the weight calculator comprises:
   a first hierarchy of M switches, wherein M is less than the number of bits in the data word, wherein each switch is controlled by a bit of the data word, a switch to route an input to an output depending on the value of the bit controlling it;
   a second hierarchy of switches, wherein for each switch in the first hierarchy of switches, there is a pair of switches in the second hierarchy of switches, wherein each pair of switches is controlled by a bit of the data word; and a logic block coupled to the second hierarchy of switches, the logic block containing circuitry to compute the weight bit.

7. The circuit of claim 6, wherein one half of the data bits in the data word is coupled to the switches in the first hierarchy of switches and the remaining data bits in the data word are coupled to the pairs of switches in the second hierarchy of switches.

8. The circuit of claim 7, wherein if a data bit is used to control a switch in the first hierarchy of switches, then the data bit is not used to control a pair of switches in the second hierarchy of switches.

9. The circuit of claim 6, wherein an input to the switches in the first hierarchy of switches is a low voltage potential.

10. The circuit of claim 6, wherein each switch is a one input to two output switch, and wherein the inputs to a pair of switches in the second hierarchy of switches are the two outputs of a switch from the first hierarchy of switches.

11. The circuit of claim 6, wherein a switch can be implemented as a one-input to two-output multiplexer.

12. The circuit of claim 1, wherein the transmission line is pulled to a voltage potential.

13. The circuit of claim 12, wherein the transmission line is pulled to a high voltage potential and the given state is a low voltage potential.

14. The circuit of claim 12, wherein the transmission line is pulled to a low voltage potential and the given state is a high voltage potential.

15. A transmission system comprising:

an encoder coupled to a data input, the encoder containing circuitry to convert data words from the data input into code words with a minimized number of occurrences of a given state;

a transmitter coupled to the encoder, the transmitter containing circuitry to inject the code words onto a transmission line, wherein the transmission line is asymmetrically terminated;

a receiver coupled to the transmission line, the receiver containing circuitry to receive code words from the transmission line; and a decoder coupled to the receiver, the decoder containing circuitry to convert code words into data words.

16. The transmission system of claim 15, wherein each code word comprises a code block and a weight bit, and wherein the decoder comprises a plurality of logic blocks coupled to the receiver, wherein each logic block is coupled to a single bit of the code block and the weight bit, the logic block to combine the inputs to produce a bit of the data word.

17. The transmission system of claim 16, wherein the logic block can be implemented as an exclusive-nor (XNOR) logic gate.

* * * * *